No. 871,159. PATENTED NOV. 19, 1907.
W. D. BAKER.
TIRE.
APPLICATION FILED JULY 16, 1906.
2 SHEETS—SHEET 1.
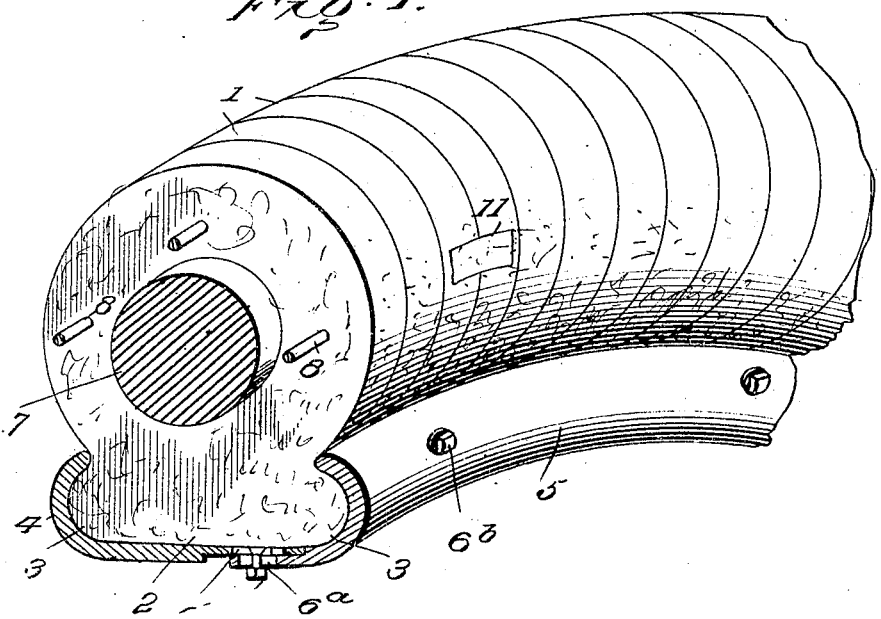
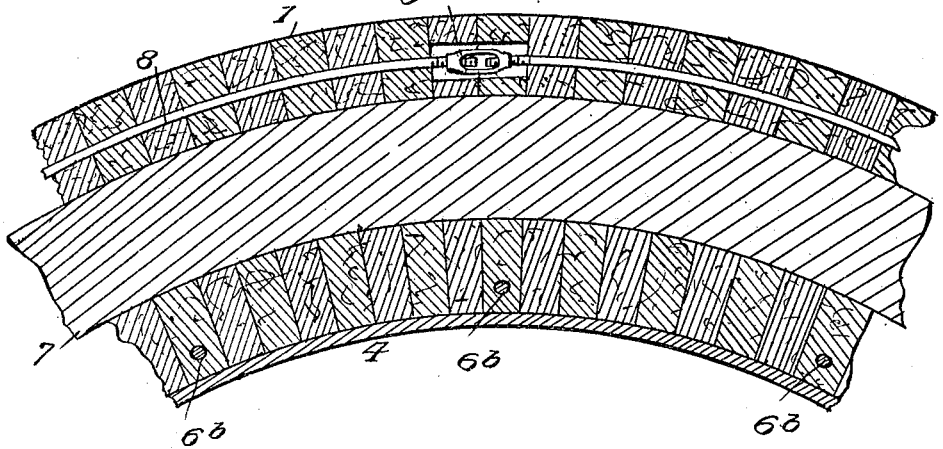
Witnesses
Inventor
W. D. Baker
By R. A. Lacey,
Attorneys No. 871,159. PATENTED NOV. 19, 1907.
W. D. BAKER.
TIRE.
APPLICATION FILED JULY 16, 1906.
2 SHEETS—SHEET 2.
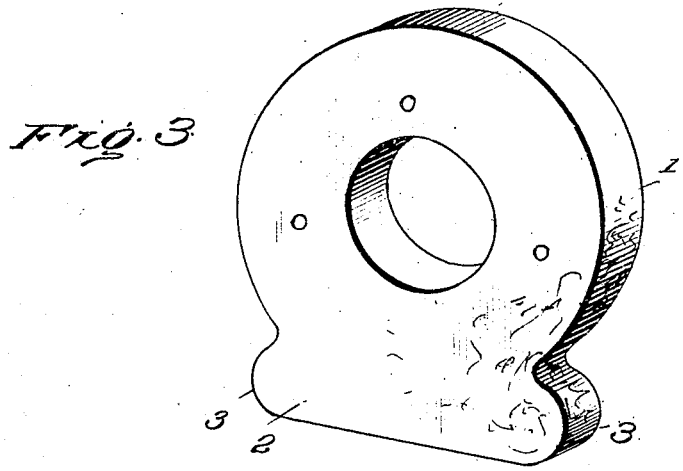
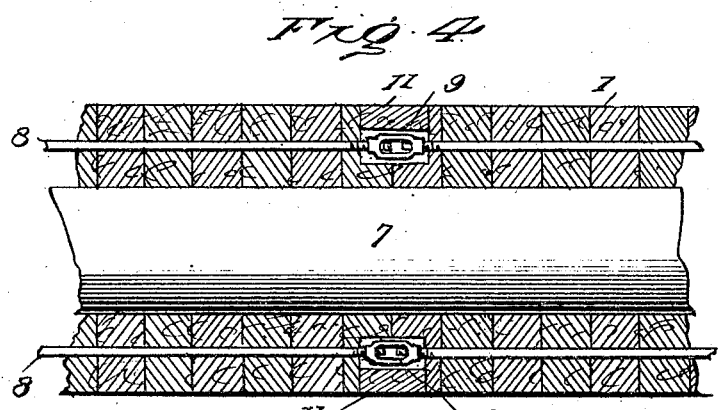
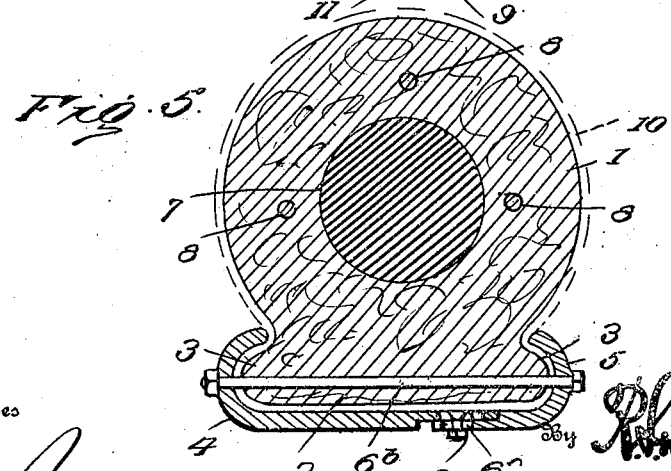

UNITED STATES PATENT OFFICE.

WINTHROP D. BAKER, OF BROCKTON, MASSACHUSETTS.

TIRE.

No. 871,159.

Specification of Letters Patent.

Patented Nov. 19, 1907.

Application filed July 16, 1906. Serial No. 326,421.

*To all whom it may concern:*

Be it known that I, WINTHROP D. BAKER, a citizen of the United States, residing at Brockton, in the county of Plymouth and State of Massachusetts, have invented certain new and useful Improvements in Tires, of which the following is a specification.

This invention contemplates certain new and useful improvements in resilient tires for vehicles, such as automobiles, sulkies, motor-cycles, carriages, and the like, and the object of the invention is to provide an improved resilient tire which will combine to a maximum degree the characteristics of resiliency, durability, strength, and ease with which it may be assembled and tightened.

For a full understanding of the invention and the merits thereof and also to acquire a knowledge of the details of construction of the means for effecting the result, reference is to be had to the following description and accompanying drawings, in which:

Figure 1 is a perspective view of a portion of the vehicle tire and rim embodying the improvements of my invention; Fig. 2 is a longitudinal sectional view thereof; Fig. 3 is a detail perspective view of one of the felt sections of the tire: Fig. 4 is a horizontal sectional view through the tire, the section being taken about centrally, and the core being shown in elevation; and, Fig. 5 is a transverse sectional view through one of the tire sections.

Corresponding and like parts are referred to in the following description and indicated in all the views of the drawings by the same reference characters.

My improved tire comprises a plurality of ring-like sections 1 of felt in a comparatively highly compressed condition, each of said sections being formed with a base enlargement 2 providing lateral lugs 3 designed to be clenched in the rim 4. The felt sections 1 are arranged with their faces abutting, and to complete the circle of the tire to form an accurate fit each section preferably tapers from its outer side to the base enlargement 2.

While my invention comprehends the securing of the section to the rim in any desired manner, in the present instance, the securing means is embodied in a sectional rim provided with a detachable lip section 5. As illustrated in Figs. 1 and 5, the detachable lip section 5 has an overlapping sliding engagement with the main section of the rim, slots 6ª being formed in the two overlapping portions of the sections and bolts 6 retaining the two sections in sliding engagement and limiting their sliding movement. Stay bolts 6ᵇ extend transversely from one lip section of the rim to the other and preferably through the base enlargements of the sections 1 of the tire, whereby to clench the two lips of the rim securely around the lugs 3 of the sections 1 to hold the tire securely in place on the wheel.

A core 7, preferably of comparatively soft rubber, is inserted within the opening of each felt section and extends circumferentially of the tire throughout the complete circle thereof.

8 designates tie wires which in the present instance are three in number, located at equidistant points as shown and embedded in the sections. The tie wires are secured together at their ends by means of comparatively thin turn-buckles 9 or similar clamping and tightening means. In addition to the tie wires 8, the sections are preferably secured together by having their abutting faces coated with cement or similar adhesive substance. While the felt itself will constitute a durable tread. I desire it to be understood that my invention also includes the covering of the felt sections with an envelop of leather or any other material, as indicated at 10 in dotted lines in Fig. 5. The felt sections may be water-proofed if desired by any substance suitable for this purpose, the sections being impregnated or coated, preferably the latter, by the water-proofing.

As a means for obtaining access to the turn-buckles 9 that are employed for tightening the tie wires 8, sundry sections 1 of the tire may be cut away at the points where the turn-buckles occur, oblong blocks 11 being removed from two adjacent sections so that a wrench or other tool may be applied to the turn-buckles. After the tie wires have been tightened these blocks may be replaced and cemented or stitched. As two adjacent ring sections 1 are cut away to provide the openings for the exposure of the turn-buckles, the sections are not weakened as they would be if one section were to be entirely cut through.

Having thus described the invention, what is claimed as new is:

1. A resilient tire constructed in ring-like sections, each of which is provided with a base enlargement producing retaining lugs adapted for reception in the rim of a wheel, a rubber core threaded through said sections, tie wires also threaded through said sections and adapted to secure said sections together, a wheel rim constructed in sections mounted to slide transversely with relation to each other and adapted to grip the retaining lugs of the tire sections, and bolts extending transversely from one section of the rim to the other and through the base enlargement of the tire sections, whereby to bind the two sections of the rim together and to assist in holding the tire sections in the rim.

2. A resilient tire constructed in ring-like sections, a rubber core threaded through said sections, and tie wires also threaded through said sections, the ends of said tie wires being joined together, and said sections being formed at the joins with recesses adapted to expose the said joins of the tie wires, and blocks secured in said recesses and adapted to cover the said joins.

3. A resilient tire constructed in ring-like sections, a rubber core threaded through said sections, tie wires also threaded through said sections, the ends of said tie wires being joined together, two adjacent sections at the joins of said tie wires being cut away to expose said joins, and blocks adapted to be held in said cut away portions and designed to close said cut away portions over the joins, as and for the purpose set forth.

In testimony whereof I affix my signature in presence of two witnesses.

WINTHROP D. BAKER. [L. S.]

Witnesses:
SIMON F. BONDRO,
WALTER KEITH.